United States Patent [19]

Nye, Jr.

[11] Patent Number: 5,105,790
[45] Date of Patent: Apr. 21, 1992

[54] CURRENT CONTROLLED FLUID BLEED

[76] Inventor: Dudley D. Nye, Jr., 4020 Galt Ocean Dr., #606, Fort Lauderdale, Fla. 33308

[21] Appl. No.: 633,394

[22] Filed: Dec. 21, 1990

[51] Int. Cl.$^5$ .............................................. F02B 43/00
[52] U.S. Cl. ................................. 123/527; 251/129.22
[58] Field of Search .................. 123/527, 528; 137/82; 251/129.22

[56] References Cited

U.S. PATENT DOCUMENTS

| | | | |
|---|---|---|---|
| 3,621,862 | 11/1971 | Wojtecki | 137/82 |
| 3,799,498 | 3/1974 | Wickham et al. | 137/82 |
| 4,084,539 | 4/1978 | Schmidt | 118/8 |
| 4,294,214 | 10/1981 | Treible | 137/495 |
| 4,325,399 | 4/1982 | Frick | 137/85 |
| 4,481,967 | 11/1984 | Frick | 137/85 |
| 4,653,523 | 3/1987 | Brown | 137/85 |
| 4,665,938 | 5/1987 | Brown et al. | 137/85 |
| 4,729,398 | 3/1988 | Benson et al. | 137/82 |
| 4,811,720 | 3/1989 | Katumata et al. | 123/527 |
| 4,836,011 | 6/1989 | Dombrowski et al. | 73/4 R |
| 4,874,005 | 10/1990 | Potter | 137/85 |
| 4,901,756 | 2/1990 | Rovner | 137/487.5 |
| 4,905,720 | 3/1990 | Benson | 137/82 |

OTHER PUBLICATIONS

Moore Products Co. Spring House, Pa., Model 771, I/P Transducers Installation/Service Manual, Feb. 1986.
Hammel Dahl Electropneumatic Transducer Model T-28 Grinnell Valve Co., Warwick, R.I., Dec. 1977, Instructions HDC 14048.
Fisher Controls Kent ME, England Model 546 and 546S, Electropneumatic Controls Bulletin 62.1:546, Feb. 1981.

Primary Examiner—Noah P. Kamen
Attorney, Agent, or Firm—Alvin S. Blum

[57] ABSTRACT

A fluid bleed device for controlling the amount of natural gas supplied to the carburetor of a turbocharged carbureted natural gas engine provides a regulated output fluid pressure to the setpoint of the natural gas supply regulator feeding the carburetor. This regulated output fluid pressure is related to the magnitude of two input variables, the turbocharger output pressure and an electric signal from an exhaust gas sensor reflecting the engine exhaust gas composition. Turbocharger air input to the bleed device passes through two restrictive orifices and a nozzle in series. The nozzle is variably occluded by a movable member controlled by an electromagnet powered by the electric signal. The regulated output fluid pressure is taken from the junction between the two restrictive orifices to supply a pressure to the gas supply regulator that is related to both turbocharger outlet pressure and the exhaust gas composition for enhanced engine efficiency.

5 Claims, 3 Drawing Sheets

CURRENT CONTROLLED FLUID BLEED

BACKGROUND OF INVENTION

This invention relates to a stable and calibratable fluid bleed unit which can be used as a controlling element in air/fuel control systems for turbocharged carbureted natural gas reciprocating engines. Presently, compressed air from the turbocharger is used as a loading pressure on the spring or setpoint side of the gas pressure regulator. Gas pressure to the carburetor is then automatically increased when more air produced by the turbocharger and this combined with the design of the carburetor keeps the air/fuel ratio about constant. This is not quite good enough, however, for obtaining maximum life from a catalytic converter when used, and for minimizing pollution.

The current controlled fluid bleed device of this invention is used to bleed and reduce the air pressure applied to the setpoint side of the fuel gas regulator, set to run the engine slightly rich, so as to trim the air/fuel ratio in response to the current output of a proportional plus integral controller. This results in more perfect control of the air/fuel ratio.

SUMMARY OF INVENTION

The current controlled bleed unit of the invention resembles, in some respects, certain current to air pressure transducers available for industrial instrumentation systems except that is does not have an output pressure dependent on d.c. input current only. The output pressure of the bleed unit of the invention is a function of a pressure input as well as the d.c. input current. A closed loop air/fuel ratio control system is reduced in complexity by using the bleed unit of the invention. This results in lower costs and increased reliability.

It is therefore one object of the invention to provide a fluid bleed unit controlled by a d.c. current (usually 1-5 mA or 4-20 mA.).

Another object is to provide a fluid bleed unit which can be used on natural gas as well as air.

Another object of the invention is to set forth a complete closed loop control system for air/fuel ratio control incorporating the current controlled bleed unit of the invention.

These and further objects and advantages of the invention will become more apparent upon reference to the following specifications, drawings and claims wherein.

DETAILED DESCRIPTION OF THE PREFERRED EMBODIMENTS

Figure 1:
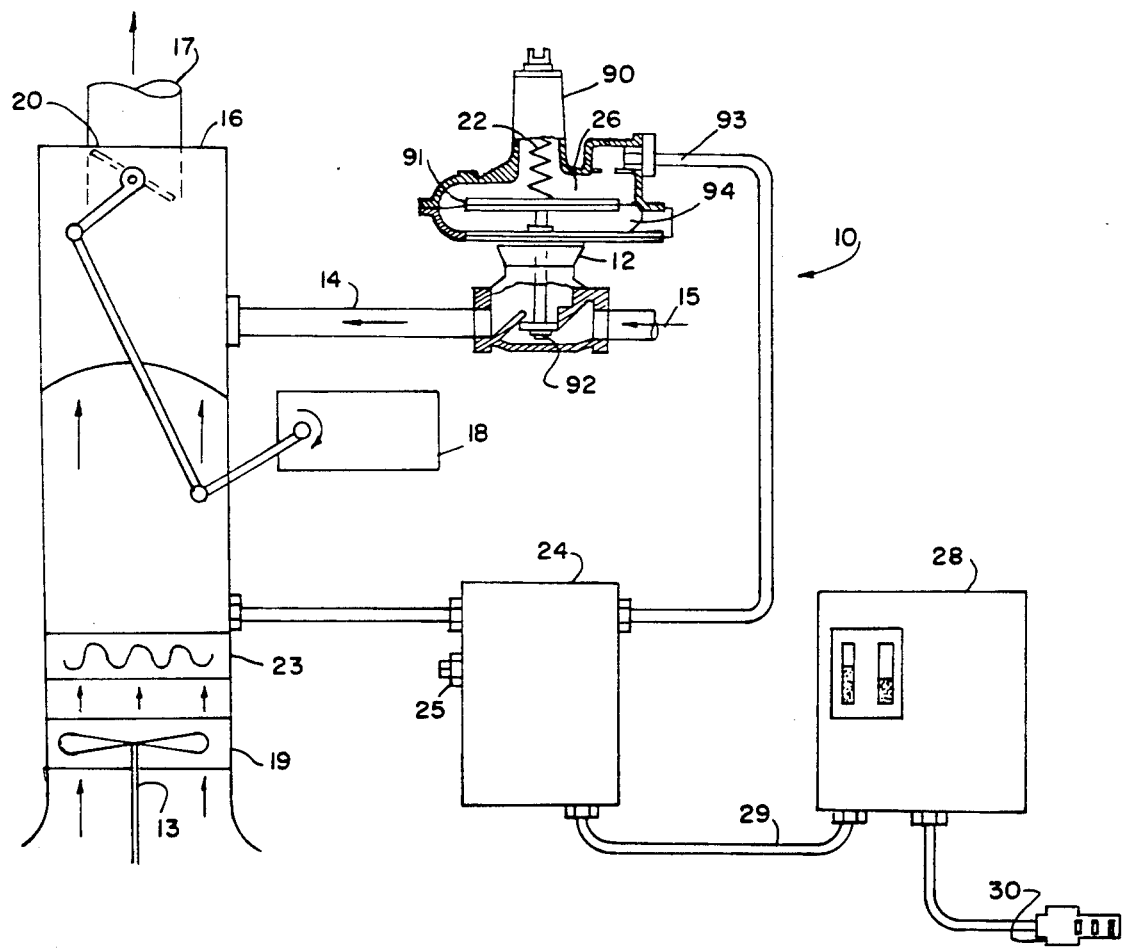
FIG. 1 is a simplified drawing of a fuel to air ratio control system incorporating the current controlled bleed unit of the invention.

FIG. 1 shows an air/fuel ratio control system 10 for use with turbocharged carbureted natural gas engine. In this system gas pressure regulator 12, with gas supply 15 as input, supplies regulated gas (typically 5 psig) 14 to carburetor 16. The engine speed is controlled by governor 18 in conjuction with butterfly valve 20 at outlet of carburetor 16. Engine intake manifold 17 conducts air and gas mixture to the engine. Gas pressure 14 is set by the setpoint spring 22 in regulator 12 and by the pressure biasing or loading pressure from the current controlled bleed device 24 of the invention. The current controlled bleed unit 24 is supplied with compressed air from the turbocharger 19 after the intercooler 23 and it also receives d.c. current via cable 29 from the proportional plus integral air/fuel ratio controller 28. Current controlled bleed unit 24 has a small exhaust flow from outlet 25. This is air exhaust in the system 10 since the supply air applied to the bleed unit 24 is air from turbocharger 19. The control loop is closed by supplying controller 28 with an electrical signal from oxygen sensor 30, located in the exhaust manifold of the engine.

Figure 2:
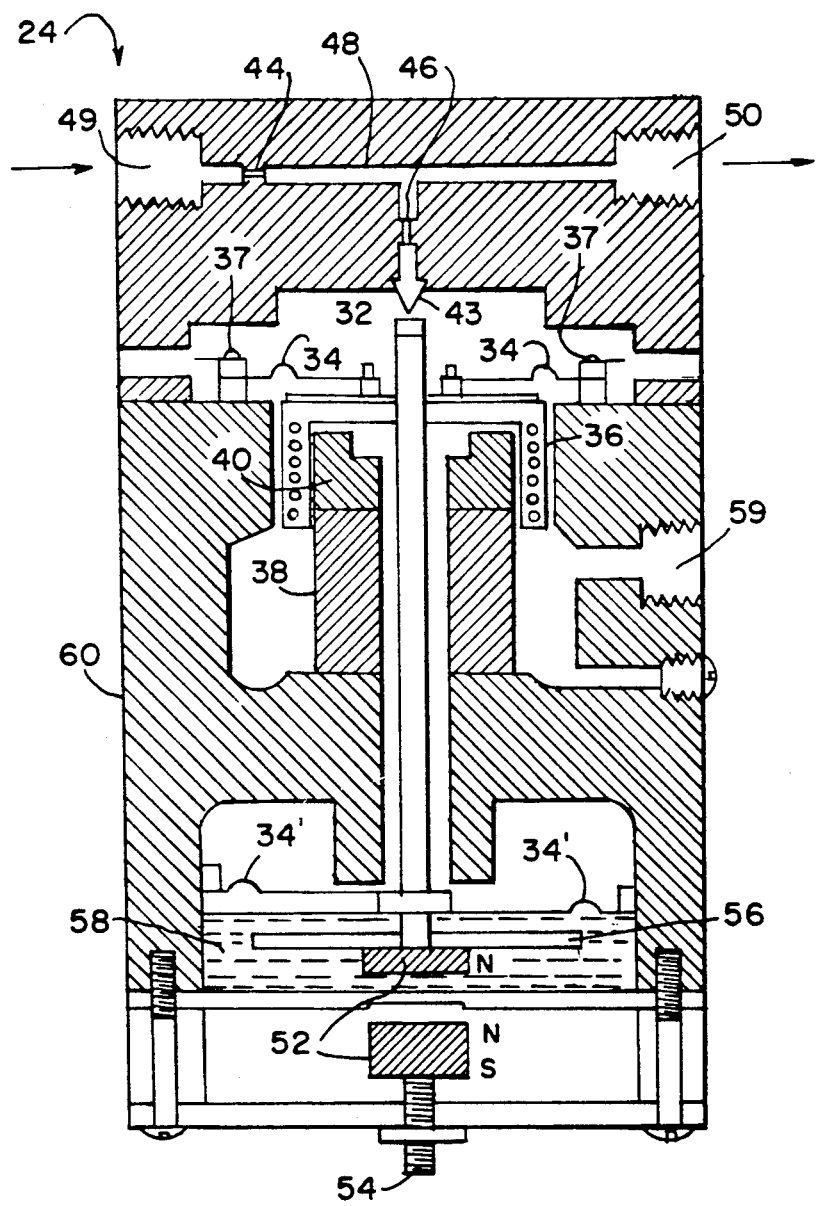
FIG. 2 is a cross sectional drawing showing the construction of the current controlled bleed unit of the invention.

FIG. 2 is a cross section view of the current controlled bleed unit 24 of the invention. The device incorporates balance shaft 32, flexures 34 spring bias flexures 34', force coil 36, coil terminals 37, magnet 38, soft iron pole piece 40, nozzle 43, nozzle orifice 46, input orifice 44, channel 48, input pressure port 49, output pressure port 50, zeroing magnets 52, zero adjustment 54, damping vane 56, damping oil 58, exhaust port 59 and unit enclosure 60. When an electric current passes through force coil electromagnet 36, the magnetic field generated therein opposes the field of magnet 38, forcing the balance shaft 32 upward.

With the device depicted as in FIG. 2, an input current into force coil 36 causes balance shaft 32 to approach the open end of nozzle 43, and at this point, with the proper setting of zero adjustment 54, nozzle 43 is not materially obstructed with respect to air flow, resulting in maximum air flow through orifices 44 and 46. The pressure drop at outlet port 50 is then near its maximum with these settings. As balance shaft 32 moves closer to nozzle 43 air flow is reduced, reducing the pressure drop at outlet port 50 until nozzle 43 is completely sealed off. When nozzle 43 is completely sealed off there is no pressure drop at outlet port 50 and the pressure is equal to input pressure at port 49. The pressure in nozzle 43 is self adjusting, up to the point of being sealed off, such that the fluid force on balance shaft 32 balances the force produced by force coil 36 and other forces on balance shaft 32. This insures that device 24 of the invention has stable and linear characteristics. Zeroing magnets 52 oppose each other to support balance shaft 32 and to provide for a calibration adjustment via screw 54. Damping vane 56 in damping oil 58 prevents the closed loop mechanical spring and mass system from oscillating. Alternatively, the buoyancy of damping vane 56 and the spring bias of flexures 34' may be arranged to provide sufficient upward bias to balance shaft 32 to eliminate zeroing magnets 52.

Figure 3:
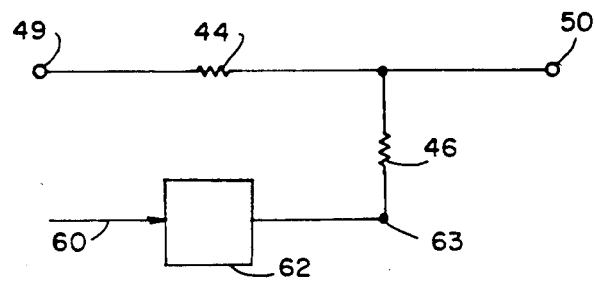
FIG. 3 is a combination block diagram and equivalent schematic for the bleed unit of the invention.

FIG. 3 is block/schematic drawing of the current controlled bleed device of the invention. Here signal 49, representing pressure from the turbocharger in FIG. 1, is directed to the input of orifice 44 and the output of orifice 44 is connected to a terminal representing the outlet pressure port 50 of device 24 of FIG. 1. Flow, controlled by the pressure at 63 determines the drop in outlet pressure 50. Current input 60 controls pressure 63 via block 62. The transfer function for the ratio of a pressure change at 50 to a current change at 60 is essentially constant for a given selection of orifices 44 and 46.

This is important when considering the proportional gain of the closed loop system of FIG. 1. It has been suggested by others that the variable bleed device might incorporate a motor positioned needle valve for orifice 46. But this would result in variation of the proportional loop gain of the closed loop system of FIG. 1 and result in sluggish response at the low flow end of orifice 46 settings. A modified gas pressure regulator 90 reduces and controls the pressure of fuel gas coming from a supply 15 by opening and closing valve 92 that is connected to diaphragm 91 until the forces on both sides of diaphragm 91 are equal. Gas pressure in chamber 94 is the only force on a first side of the diaphragm and will reflect the regulator outlet pressure in conduit 14 supplying fuel to the carburetor 16. The second side of diaphragm 91 has two forces acting on it: An adjustable spring bias 22 which is well known in the art, and a second force, the gas pressure in chamber 26, as supplied by conduit 93. This controlling gas pressure is regulated by a sensor 30 in the exhaust stream of the engine (not shown) to modulate the carburetor fuel supply for cleaner fuel burning to reduce stress on the environment and any catalytic converter.

Figure 4:
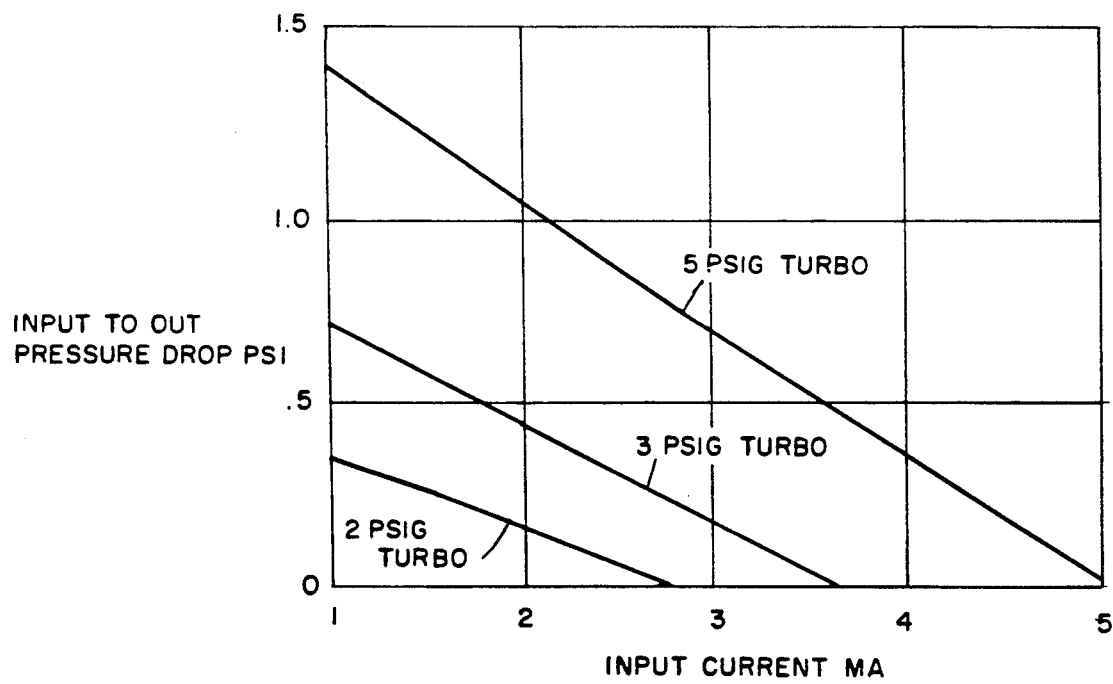
FIG. 4 is a graph representing the input to output pressure drop of a typical bleed unit as a function of input d.c. current and input pressure.

FIG. 4 shows the input to output pressure drop of the current controlled bleed device of the invention as a function of input pressure derived from the turbocharger and the input current derived from the air/fuel.

The turbocharger pressure is initially at a very low value when the engine is first started. It then gradually builds up with engine temperature and load application. The turbocharger air output pressure reaches a maximum value, of typically 5 psig, as controlled by a regulator (not shown) on the engine exhaust side of the turbocharger. Since the lines in the graph shown are almost parallel there is very little proportional gain change, when considering the closed loop system of FIG. 1.

The invention has been described with reference to the preferred embodiments. Obviously, modifications and alterations will occur to others upon reading and understanding the preceding detailed descriptions. It is intended that this invention be construed as including all such alterations and modifications insofar as they come within the scope of the appended claims or the equivalents thereof.

Having thus described the preferred embodiments, the invention is now claimed to be:

1. An electric current controlled fluid bleed device comprising:
   a body member having a fluid inlet port, an outlet port, and an exhaust port, said inlet port arranged for supplying pressured fluid thereto;
   a movable member with a first magnetic means for providing a magnetic field rigidly attached thereto;
   a channel connecting said inlet port to said outlet port; a branch line connected intermediate said channel to be variably occluded by said movable member; two restrictions, a first restriction located in said branch line and a second restriction located in said channel upstream of said branch line,
   a nozzle having an inlet end and an outlet end, with the outlet end arranged to be variably occluded by said movable member and with the inlet to said nozzle communicating with said branch line
   conduit means for conducting fluid from said nozzle to said exhaust port;
   bias means for applying a bias force between said movable member and said body member; and
   a stationary second magnetic means connected to said body member and arranged to interact magnetically with said first magnetic means to thereby apply a moving force to said movable member for variably occluding said outlet end of said nozzle, at least one of said magnetic means being an electromagnet in which a magnetic field is generated by an electric current applied thereto by said variable electric current;
   whereby said electric current controls the magnetic force regulating the force on said movable member for variably occluding said nozzle, and the force occluding said nozzle regulates the flow of said pressurized supply fluid through said restrictions and past the partially occluded nozzle, and the fluid pressure at said outlet port will be substantially equal to the pressure at the outlet of said second restriction and that pressure will be controlled by the magnitude of said electric current in combination with the pressure of said pressurized supply fluid.

2. A current controlled bleed device according to claim 1 in which said bias force is provided by a spring connected between said movable member and said body member.

3. A current controlled bleed device according to claim 1 in which said bias force is obtained by magnetic force provided by permanent magnets with one magnet connected to said body member and another magnet connected to said movable member.

4. The bleed device according to claim 1 further comprising:
   a fuel gas pressure regulator having an inlet for a supply of fuel gas and an outlet for supplying gas fuel to an internal combustion engine at a controlled gas pressure regulated by the composition of exhaust gas emitted by said engine, in which said controlled gas pressure is controlled by a gas pressure regulator provided with a diaphragm having two broad faces with said gas fuel on a first broad face and a controlling force applied to a second broad face, said controlling force provided by a setpoint spring and by a loading or biasing fluid pressure in combination;
   a conduit connection means for fluid connection between said pressure regulator and said outlet port of said bleed device for providing said biasing fluid pressure; and
   an exhaust gas sensing means for sensing the compositon of the exhaust gas from the engine, said sensing means including means for generating said variable electric current for applying to said electromagnet of said bleed device.

5. A transducer for providing an output fluid pressure whose magnitude is related to the magnitude of two different input variables, an inlet fluid pressure and an inlet electrical current, the transducer comprising:
   a) a transducer body having a pressurized fluid inlet, a fluid pressure outlet, a fluid exhaust port, and an electrical current input;
   b) a channel connecting said fluid inlet to said fluid pressure outlet; a branch line connected intermediate said channel; two restrictions, a first restriction located in said channel upstream of said branch line and a second restriction located in said branch line; an aperture means for conduction of fluid therethrough located in said branch line downstream of said second restriction, said fluid exhaust port being connected downstream of said apperture means in said branch line; and c) a movable member having attached thereto an aperture-occluding means for variably occluding said aperture means, said movable member arranged for movement within said body under a moving force generated by a biasing means in combination with a variable electrical current supplied by connection to said electrical current input, wherein said aperture-occluding means variably occludes said aperture means with a force that varies in relation to said electrical current;

whereby the outlet fluid pressure reflects the inlet fluid pressure minus the pressure drop across the first restriction, and the pressure drop across the first restriction is related to the fluid flow therethrough which is related to the occluding force produced by said variable electrical current.

* * * * *